United States Patent
Poli

(10) Patent No.: US 11,590,488 B2
(45) Date of Patent: Feb. 28, 2023

(54) DOSING DEVICE

(71) Applicant: Festo SE & Co. KG, Esslingen (DE)

(72) Inventor: Daniel Rocha Poli, Westford, MA (US)

(73) Assignee: Festo SE & Co. KG, Esslingen (DE)

( * ) Notice: Subject to any disclaimer, the term of this patent is extended or adjusted under 35 U.S.C. 154(b) by 1029 days.

(21) Appl. No.: 16/294,370

(22) Filed: Mar. 6, 2019

(65) Prior Publication Data

US 2020/0282391 A1   Sep. 10, 2020

(51) Int. Cl.
*B01L 3/02* (2006.01)
*G01F 13/00* (2006.01)

(52) U.S. Cl.
CPC ........... *B01L 3/0234* (2013.01); *B01L 3/0241* (2013.01); *G01F 13/00* (2013.01); *B01L 3/0237* (2013.01)

(58) Field of Classification Search
None
See application file for complete search history.

(56) References Cited

U.S. PATENT DOCUMENTS

| | | | | |
|---|---|---|---|---|
| 2003/0118486 A1* | 6/2003 | Zhou | ..................... | B01J 19/0093 422/400 |
| 2005/0032238 A1* | 2/2005 | Karp | ................. | B01L 3/502753 422/400 |
| 2005/0074872 A1* | 4/2005 | Furino | ................... | B01L 3/0241 600/300 |
| 2005/0284213 A1* | 12/2005 | Karp | ................... | G01N 30/6095 73/61.52 |
| 2009/0098541 A1* | 4/2009 | Southern | ................ | C12M 47/06 435/287.1 |
| 2010/0028986 A1* | 2/2010 | Hanafusa | .......... | B01L 3/502738 422/600 |
| 2010/0290309 A1* | 11/2010 | Glazier | ................... | B01F 25/41 204/601 |
| 2014/0255270 A1* | 9/2014 | Satsanarukkit | ... | B01L 3/502707 427/226 |
| 2018/0353949 A1* | 12/2018 | Frayling | ............... | C12Q 1/6869 |

FOREIGN PATENT DOCUMENTS

DE   102014013552 B3   5/2015
DE   102017207524 A1   11/2018

\* cited by examiner

*Primary Examiner* — Brian R Gordon
(74) *Attorney, Agent, or Firm* — Hoffmann & Baron, LLP

(57) ABSTRACT

A dosing device is proposed which is designed for dosed output of a fluid. The dosing device has a block-shaped channel body, through which a dosing channel system passes. The dosing channel system has a fluid infeed opening and a plurality of fluid output openings. The fluid output openings are formed by the channel apertures of narrowed output sections of a plurality of output channels of the dosing channel system. The entire dosing channel system, including the output channels, is formed in the block-shaped channel body. The dosing channel system is preferably structured such that the flow velocity of the fluid channelled through during operation is at least substantially the same throughout with the exception of in the output sections of the output channels.

19 Claims, 5 Drawing Sheets

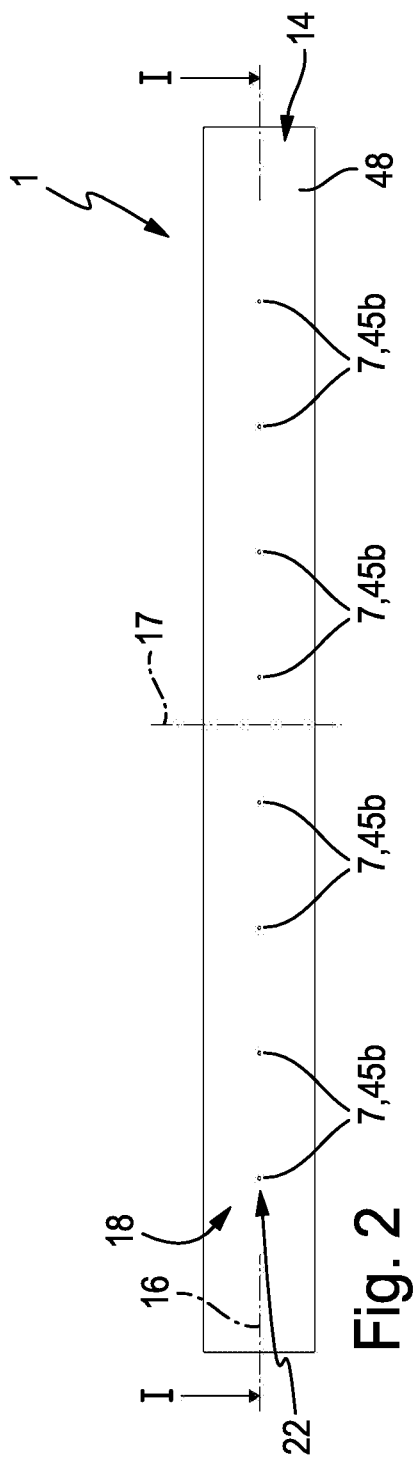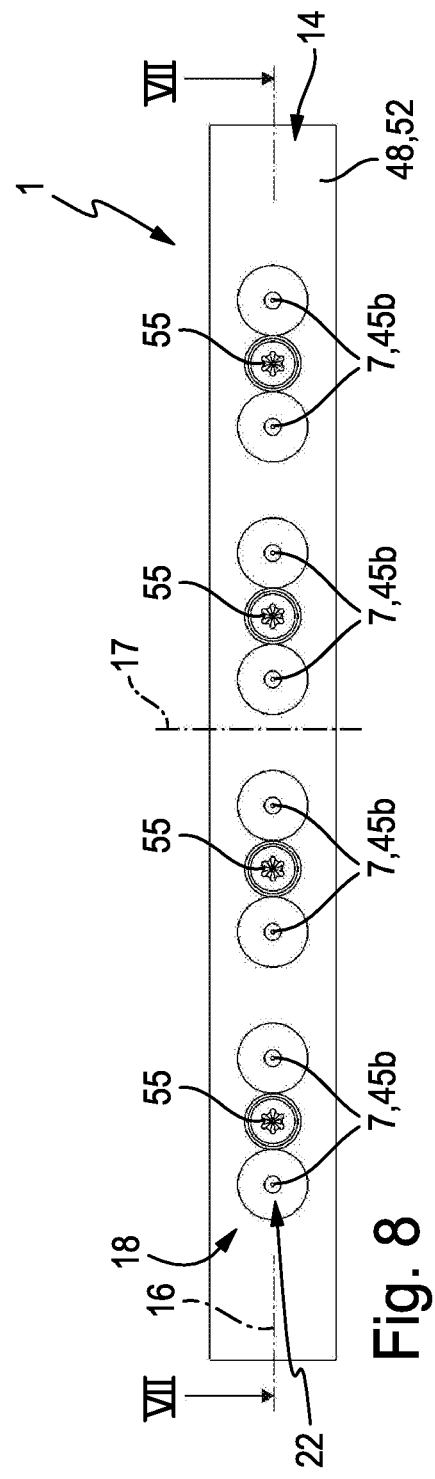

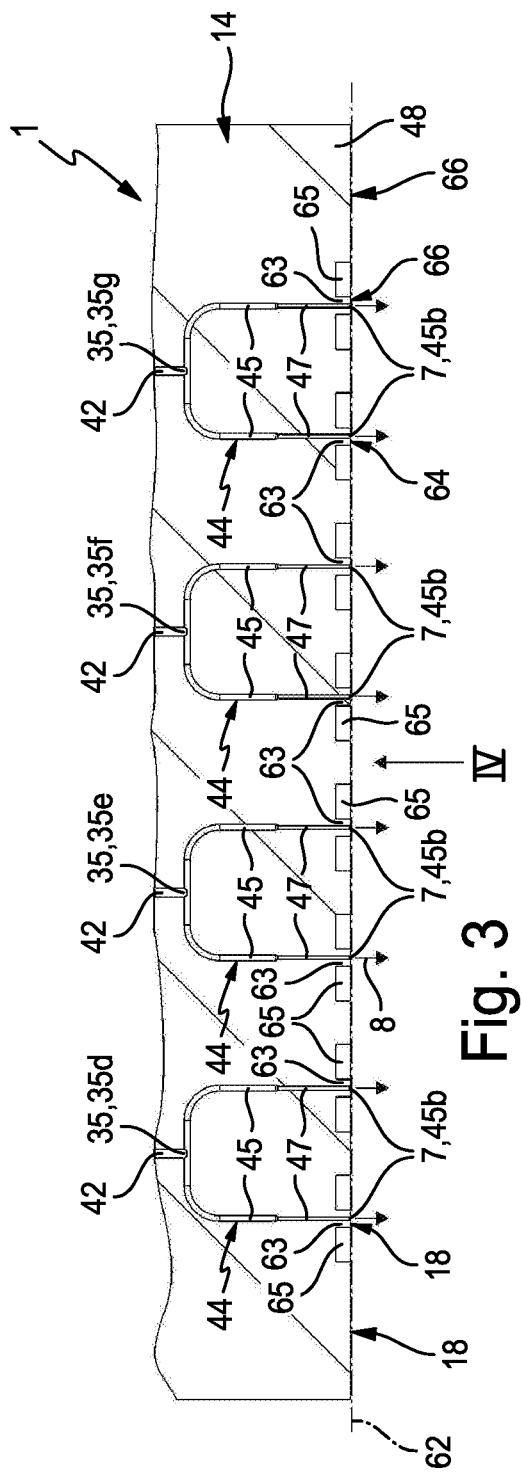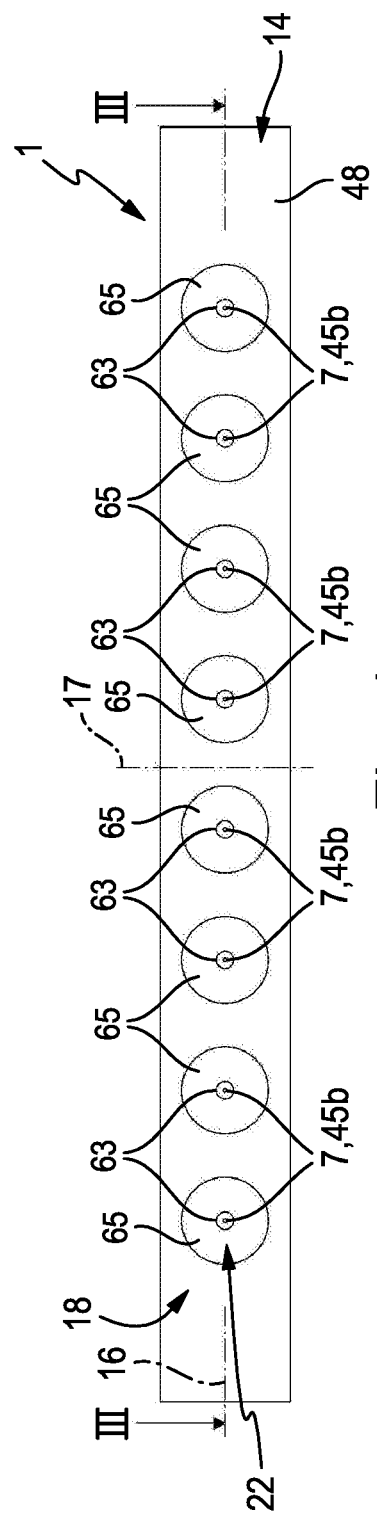

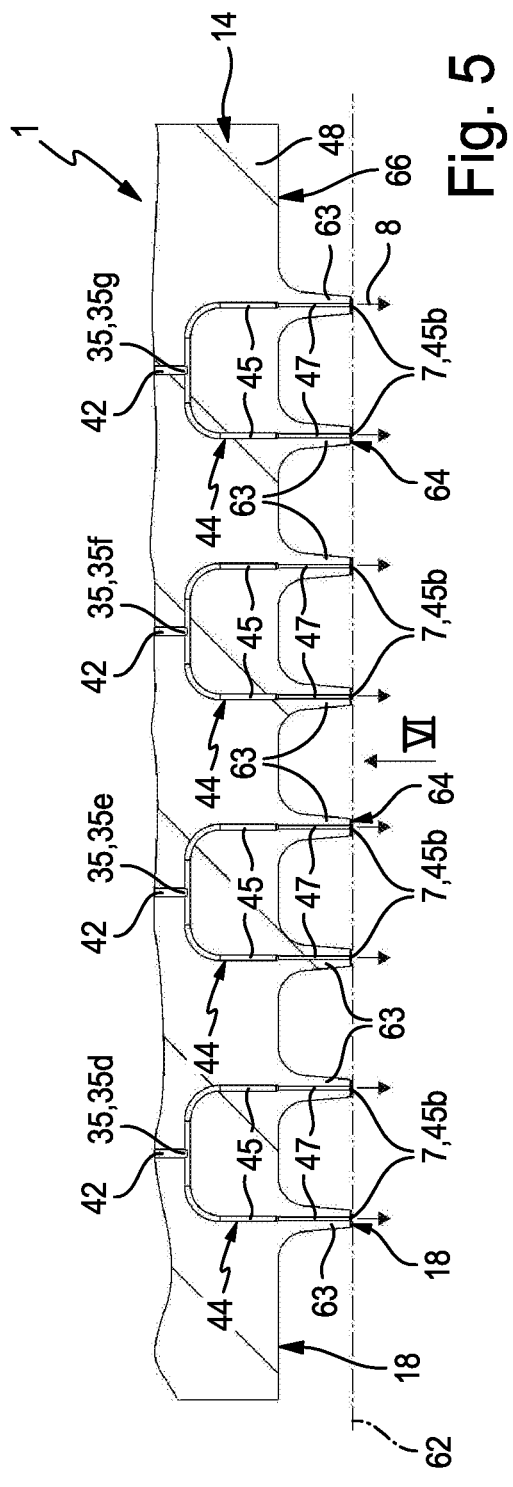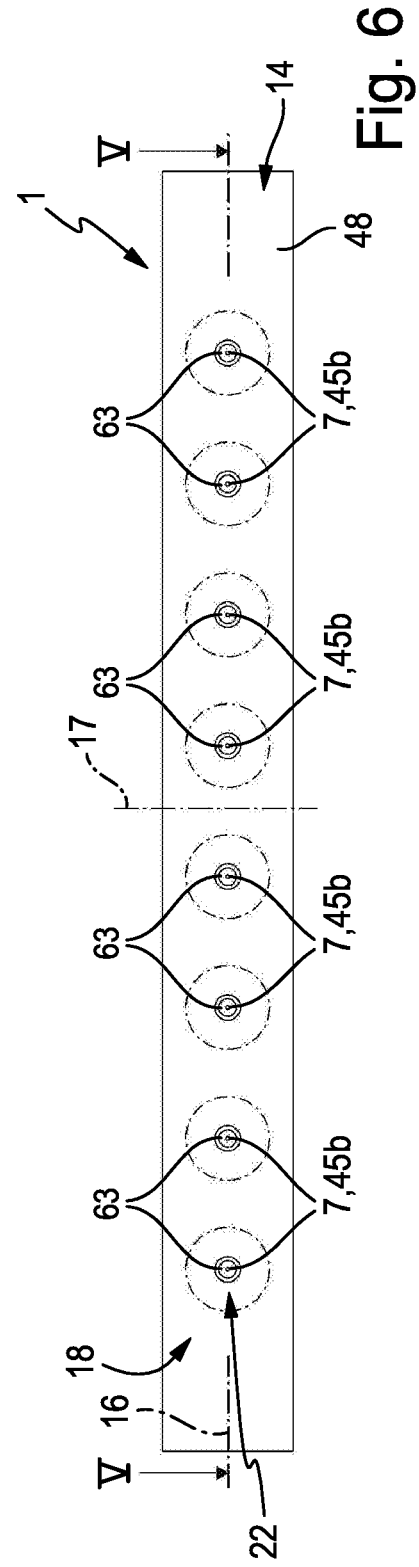

DOSING DEVICE

BACKGROUND OF THE INVENTION

The invention relates to a dosing device for dosed output of a fluid, comprising a block-shaped channel body, through which a dosing channel system passes, which has at least one fluid infeed opening formed in the channel body to feed the fluid to be dosed and a plurality of fluid output openings arranged in a row beside one another to output the fluid, each fluid output opening being formed by a channel aperture of a narrowed output section of an output channel of the dosing channel system, the channel cross-section of the output section of each output channel being smaller than the channel cross-section of an input section of the respective output channel directly adjoined thereto upstream in the direction of the fluid infeed opening.

A dosing device of this type is known from DE 10 2017 207 524 A1. Such a dosing device allows the dosed output of a fluid in carrier substrates, for example in so-called microtiter plates. The fluid quantities output per dosing operation are generally relatively small and often represent so-called fluid samples which are for example biological or biochemical analysis samples which have to be analysed or treated in another manner The dosing device has a dosing channel system, which extends between a fluid infeed opening and a plurality of fluid output openings, the fluid to be dosed being capable of being fed into the dosing channel system via the fluid infeed opening and of being output again in a dosed manner via the fluid output openings. The fluid output openings are formed by the apertures of individual output channels, which end with a narrowed output section, so that a very precise dosing of the fluid quantities is possible. The majority of the dosing channel system so far runs in a block-shaped channel body, which is fitted on its underside with tubular nozzle needles, which define the narrowed output sections of the output channels. The dosing needles are screwed into the channel body and sealed with the aid of fittings. The manufacture and assembly of such a dosing device is relatively complex.

A dosing device is also known from DE 10 2014 013 552 B3, which has a dosing channel system, which is formed partly in a block-shaped channel body and partly in nozzle needles fastened to the channel body.

SUMMARY OF THE INVENTION

The object underlying the invention is to provide a dosing device, which is easily and cost-effectively manufacturable with high operational accuracy.

In order to achieve this object, in connection with the features mentioned at the outset, the entire dosing channel system including the output channels is formed in the block-shaped channel body.

The dosing device according to the invention dispenses with nozzle needles common up to now in order to implement the output section of the individual output channels of the dosing channel system. The output channels, including their narrowed output sections, are integrated like the normal components of the dosing channel system directly into the block-shaped channel body. In this manner, the dosing device can be manufactured with smaller dimensions such that less space is required at the installation site. Since fastening means for nozzle needles do not have to be formed in the channel body, the channel body can be designed very compactly and the processing costs for machine processing do not apply. The complexity for the assembly of the dosing device is also low since the subsequent individual fastening of separately manufactured dosing needles is not required. In addition, the channel cross-sections inside the dosing channel system can be formed very precisely when manufacturing the block-shaped channel body which is positively reflected in the operational accuracy when dosing the fluid. The cleaning effort after using the dosing device is also reduced since the entire dosing channel system can be cleaned with a single rinsing operation and separate cleaning of nozzle needles to be previously disassembled is not required.

Advantageous further developments of the invention are described in the dependent claims.

It is, in principle, possible to equip the dosing channel system with a plurality of fluid infeed openings in order to enable a simultaneous, repeated feeding of the fluid to be dosed. A plurality of fluid infeed openings can also be used in order to feed different fluids, which are mixed together inside the dosing channel system. However, an embodiment is preferred in which the dosing channel system has a single fluid infeed opening, all output channels of the dosing channel system being connected to this single fluid infeed opening.

The dosing channel system preferably contains at least one output channel group, which is composed of a plurality of output channels connected fluidically in parallel. In addition, the dosing channel system has an input channel, which has the fluid infeed opening and which is fluidically connected to the input sections of all output channels of the at least one output channel group. The fluid fed via the fluid infeed opening is branched inside the dosing channel system into the individual output channels so that it is output simultaneously at a plurality of fluid output openings for further use.

The dosing channel system expediently has a plurality of output channel groups, each output channel group consisting of a plurality of output channels connected fluidically in parallel. The output channels of all output channel groups are connected via their input sections to an input channel comprising the fluid infeed opening.

Each output channel group can, in principle, be composed of any number of output channels. It has been proven to be particularly advantageous for each output channel group to comprise exactly two output channels.

The dosing channel system can be designed such that it contains only one single output channel group, whose output channels are commonly connected with their input sections to an input channel comprising the fluid infeed opening. In this manner, a fluid fed into the input channel during operation of the dosing device is divided evenly and directly into the plurality of adjoining output channels.

In the case of a particularly expedient design of the dosing device, the dosing channel system has a plurality of intermediate channels, which are incorporated in a grouped manner between the input channel and the plurality of output channels. As a result, a fluidically particularly favourable division of the fluid flows inside the dosing channel system can be achieved.

The dosing channel system preferably has a first intermediate channel group, which consists of a plurality of first intermediate channels connected fluidically in parallel, each first intermediate channel having an input, via which it is connected at a branching point to the input channel A plurality of intermediate channel groups are incorporated in a cascade manner between the input channel and the output channels, wherein a plurality of last intermediate channel groups is present, which each contain a plurality of last intermediate channels, to which one of the plurality of output channel groups is directly connected respectively. To this end, each last intermediate channel of each last intermediate channel group is connected with its output via a further branching point to all output channels of respectively one of the plurality of the output channel groups. The last intermediate channels of each last intermediate channel group are commonly connected upstream with their input in turn via a branching point with the output of one of the first intermediate channels of the first intermediate channel group. The latter is directly the case when the last intermediate channel groups are second intermediate channel groups and no further intermediate channel groups are incorporated between the last intermediate channel groups and the first intermediate channel group. However, further intermediate channel groups can also be incorporated between the last intermediate channel groups and the first intermediate channel group.

The dosing channel system is preferably composed of the following channels: an input channel; a first intermediate channel group formed by two first intermediate channels; two second intermediate channel groups, which each consist of two second intermediate channels and are connected on the input side with respectively one of the two first intermediate channels; and four output channel groups, which are each composed of two output channels, which are each connected with their input to one of the four second intermediate channels so that in total eight output channels are present.

Therefore, there is a cascade inside the channel course of the dosing channel system, in the case of which the number of channels present doubles from channel group to channel group.

A plurality of third intermediate channel groups or third and fourth intermediate channel groups etc. can for example also certainly be present to increase the number of output channels.

The series of fluid output openings can be designated as an opening series. In this case, it is in particular a linear opening series. The fluid output openings inside the opening series are preferably arranged distributed evenly at the same distances to one another.

The block-shaped channel body is expediently designed such that at least the output sections of the output channels are designed in a unitary section of the block-shaped channel body. The unitary section of the block-shaped channel body is expediently manufactured integrally and preferably from one piece.

One embodiment is considered particularly advantageous in the case of which not only the output channels or only their output sections are formed in a unitary section of the block-shaped channel body, but rather the entire dosing channel system. The entire block-shaped channel body is expediently formed in a unitary manner The unitary design can be implemented such that an integral and preferably a one-piece embodiment of the block-shaped channel body is present.

In the case of a preferred embodiment, the block-shaped channel body is structured modularly. It has a channel body base module and a unitary channel body output module fastened in a joining region to the channel body base module. Aside from the output sections of the output channels, the entire dosing channel system is formed in the channel body base module such that the channel body base module also contains the input sections of the output channels. The output sections of the output channels are located in the channel body output module and are connected in each case to one of the input sections when the channel body output module is fastened in the joining region to the channel body base module.

The channel body output module is preferably detachably fastened to the channel body base module. To this end, a screw fastening is in particular provided. The detachable fastening provides the option of fitting one and the same channel body base module alternatively with different channel body output modules, which differ from one another for example in the design and in particular in the cross-section of the output sections of the output channels.

Seals are expediently present in the joining region between the output sections and input sections merging into one another in pairs in order to prevent a leak.

The fluid output openings of all output channels of the dosing channel system are expediently located on a surface formed on the outside of the block-shaped channel body, which is designated as output surface to better distinguish it. The fluid output openings are placed on the output surface such that they lie in a common plane, which is designated as the opening plane to better distinguish it.

In the case of a particularly cost-effective embodiment, the output surface is designed flat, the opening plane coinciding with the output surface.

It is considered more favourable for the dosing process when the output surface is structured in a relief-like manner, each fluid output opening being formed at the end face on a pipe socket-like section of the channel body, which encloses a longitudinal section of the output section of an output channel As a result, draining of the fluid is favoured when the fluid output is stopped. An uncontrolled migration of fluid drops along the output surface can be reliably prevented in this manner.

In the case of one possible design, each pipe socket-like section of the channel body is coaxially surrounded by a circular depression of the channel body, which is axially open in the same direction as the associated fluid output opening.

The circular depressions act like trenches. Each one of the pipe socket-like sections is expediently separated from a base surface section of the output surface by the circular depressions. The length of the pipe socket-like sections can be selected such that the pipe socket-like sections are set back in relation to the base surface section or protrude in relation to the base surface section. A preferred structure can be particularly easily manufactured, in the case of which the pipe socket-like sections are formed such that their end faces lie in the same plane as the base surface section. As a result, the opening plane also lies in the same plane as the base surface section.

Essentially, the output surface can have a base surface section, in relation to which the pipe socket-like sections of the channel body protrude such that the opening plane is distanced from the base surface section. In this case, the base surface section can extend to the foot of the pipe socket-like sections without a circular depression formed therebetween.

The dosing device expediently contains at least one electrically actuatable control valve device, which is attached to the channel body forming a channel body and control valve device assembly. The control valve device can also be integrated into the channel body.

The control valve device has a valve inlet designed to supply the fluid to be dosed and also has a valve outlet, which is connected to the fluid infeed opening of the dosing channel system. During the operation of the dosing device, the fluid to be dosed is supplied to the valve inlet via a fluid channel and/or via a fluid line. The fluid connection between the valve inlet and the valve outlet can be opened or closed if required by an electrical actuation of the control valve device in order to feed a fluid quantity to be dosed into the dosing channel system.

Fluids can be particularly precisely dosed using the dosing device when the channel cross-sections of the dosing channel system are designed such that when channelling a fluid to be dosed the flow velocity of the fluid throughout the dosing channel system, with the exception of in the output sections of the output channels, is at least substantially equal and preferably exactly equal.

Essentially, there is the problem of a formation of air bubbles when filling the dosing channel system with fluid for the first time. The air bubbles generally do not migrate inside the dosing channel system, but lead to irregularities in the channel cross-sections, which in turn affects the dosing accuracy. As was surprisingly shown, the air bubble formation can be significantly minimised if the dosing channel system is designed such that, aside from the output sections of the output channels, the same or at least substantially the same flow velocity of the fluid prevails in the entire dosing channel system.

Since the channel cross-sections of the dosing channel system inside the relatively narrow output sections of the output channels are the smallest, a higher flow velocity prevails there than in the other channels of the dosing channel system.

The aforementioned advantageous design of the dosing channel system is also implementable in the case of a construction of the dosing device, in the case of which the output channels or the output sections of the output channels are not formed in the block-shaped channel body, but rather are designed in separate nozzle needles individually fastened to a block-shaped channel body. However, in connection with the integration of the entire dosing channel system explained further above into the block-shaped channel body, a particularly advantageous dosing device emerges.

In order to particularly easily implement the same flow velocities, the dosing channel system expediently contains a plurality of branching points, at which, respectively, a first channel section connected to the fluid infeed opening branches into a plurality of second channel sections each connected to at least one fluid output opening, the channel cross-section of the first channel section at each branching point being at least substantially equal to the sum of the channel cross-sections of the second channel sections.

With reference to the above embodiments, a branching point is for example located between the input channel and the intermediate channels adjoining thereto or between an intermediate channel and the output channels adjoining thereto.

Dispensing with nozzle needles and fastening means required therefor on the block-shaped channel body, also provides, inter alia, the advantageous possibility of forming the block-shaped channel body relatively narrowly such that it has a plate-shaped design.

The channel course inside the dosing channel system is preferably selected such that all channels of the dosing channel system lie in a common plane, which can be designated as the dosing channel plane. The block-shaped channel body can be formed very narrowly especially in the direction perpendicular to the dosing channel plane.

BRIEF DESCRIPTION OF THE DRAWINGS

The invention is explained in more detail below with reference to the attached drawing, in which:

FIG. 2 shows the dosing device from FIG. 1 in a view according to the arrow II from FIG. 1 with a view to the output surface, FIG. 3 shows an alternative exemplary embodiment of the dosing device, which differs from that of FIGS. 1 and 2 only in the shape of the section A surrounded in a dot-dashed manner in FIG. 1 such that for the sake of simplicity only the section A is shown and namely in a longitudinal section according to the section line III-III from FIG. 4, FIG. 4 shows a view to the output surface of the dosing device from FIG. 3 with a viewing direction according to arrow IV from FIG. 3, FIG. 5 shows a section corresponding to the section A from FIG. 1 of a further embodiment of the dosing device in a longitudinal section according to section line V-V from FIG. 6, FIG. 6 shows a view to the output surface of the dosing device according to FIG. 5 with a viewing direction according to arrow VI from FIG. 5, FIG. 8 shows a view to the output surface of the dosing device from FIG. 7 with a viewing direction according to arrow VIII from FIG. 7.

DETAILED DESCRIPTION

Figure 1:
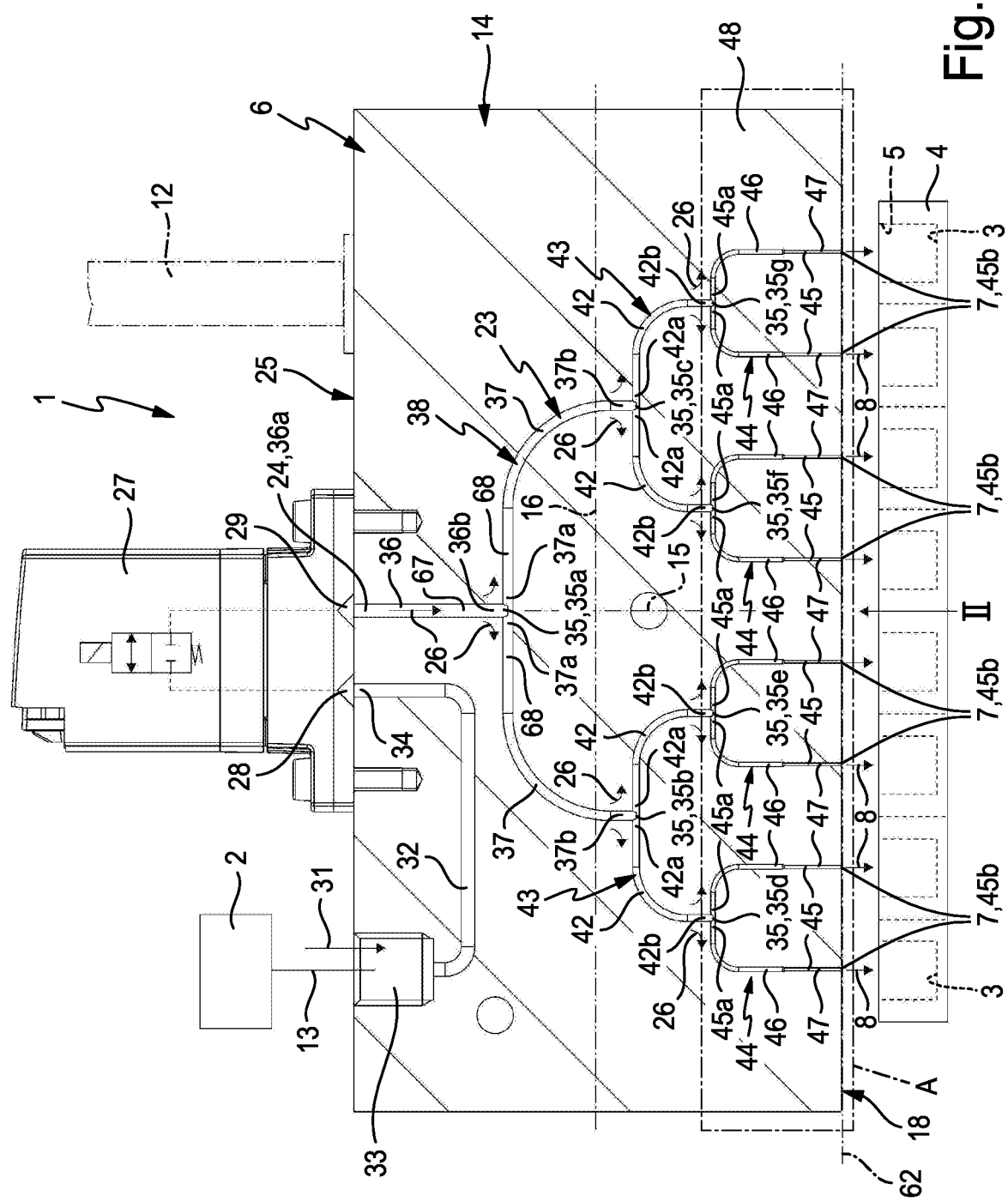
FIG. 1 shows a preferred first embodiment of the dosing device according to the invention in a longitudinal section according to section line I-I from FIG. 2.

The drawing shows, to some extent only in sections, a plurality of embodiments of a dosing device 1, which is designed in order to form a fluid provided in a fluid reservoir 2 simultaneously in the form of a plurality of dosed fluid quantities in receiving chambers 3 of a receiving substrate 4. The fluid quantities to be dosed are in particular fluid samples.

The receiving substrate 4 is for example a so-called microtiter plate, which has a plurality of depressions, which represent the receiving chambers 3. Each receiving chamber 3 has a fill opening 5 pointing upwards in the operational alignment of the receiving substrate 4, through which the fluid quantity to be dosed is fillable into the receiving chamber 3 from above.

The dosing device 1 is for example used in laboratories in medical technology, in the pharmaceutical sector or in the foodstuff sector.

The dosing device 1 preferably has a dosing head 6, which has on an underside a plurality of fluid output openings 7 arranged in a linear row beside one another, at which the fluid can be output as dosed fluid quantities. The output of the fluid quantities is illustrated by arrows 8. The distribution pattern of the fluid output openings 7 corresponds to that of the receiving chambers 3 such that the receiving substrate 4 can be arranged under the fluid output openings 7 such that each fluid output opening 7 is located vertically above one of the fill openings 5. As a result, the fluid quantities that can be output at the fluid output openings 7 can be filled into the receiving chambers 3 of the receiving substrate 4 from above.

The dosing device 1 is preferably equipped with a positioning system 12 only indicated schematically to which the dosing head 6 is attached and through which the dosing head 6 is positionable as required by performing a positioning movement, in particular in order to be able to position it precisely over a receiving substrate 4. The dosing head 6 is displaceable and continuously positionable by the positioning system 12 preferably both vertically and horizontally.

The fluid reservoir 2 is connected to the dosing head 6 preferably via a fluid line 13 in order to supply the fluid to be dosed. The fluid line 13 is expediently flexible. The fluid reservoir 2 can be attached to the dosing head 6 such that it participates in its movement or it is mounted fixedly separated from the dosing head 6.

The flow of fluid current from the fluid reservoir 2 to the fluid output openings 7 takes place either under the force of gravity or by means of overpressure, which is provided by a pressure generator, not illustrated.

The dosing device 1 has a block-shaped channel body 14, which belongs to the dosing head 6 in the illustrated exemplary embodiments. The channel body 14 has a vertical axis 15 indicated in a dot-dashed manner, which is aligned vertically when the dosing device 1 is used as intended. The channel body 14 also has a longitudinal axis 16 at right angles to the vertical axis 15 and a transverse axis 17 at right angles to both the vertical axis 15 and the longitudinal axis 16. The transverse axis 17 is perpendicular to the drawing plane in FIGS. 1 and 7.

The block shape of the channel body 14 can be selected as desired. A square-shaped structure is preferred, as emerges by way of example from the drawing. The outer surfaces of the channel body 14 can also be arched at least partially. A shape is particularly advantageous in which the dimensions in the axial direction of the transverse axis 17 also designated below as transverse direction 17 are significantly smaller than the dimensions in the vertical direction 15 and in the longitudinal direction 16 such that the block-shaped channel body 14 has a plate-like structure. The vertical direction 15 is the axial alignment of the vertical axis 15 and the longitudinal direction 16 is the axial direction of the longitudinal axis 16.

The fluid output openings 7 are formed in the channel body 14. They are for example located on the outer surface of the channel body 14 pointing downwards, which is designated as output surface 18.

A linear series of openings 22 formed by the plurality of fluid output openings 7 present extends in the longitudinal direction 16. The distances between the respectively adjacent fluid output openings 7 is preferably the same.

A dosing channel system 23 is formed inside the channel body 14. The dosing channel system 23 runs between a fluid infeed opening 24 and the fluid output openings 7, branching repeatedly in the channel course. The fluid infeed opening 24, which is preferably only present once, is located on an outer surface of the channel body 14 identical to the output surface 18, which is designated as the infeed surface 25 below to better distinguish it and which is preferably located on the upper side of the channel body 14 opposed to the output surface 18.

The fluid to be dosed is fed into the dosing channel system 23 at the fluid infeed opening 24 and leaves the dosing channel system 23 at the same flow rate to one another via the fluid output openings 7. The fluid flow occurring in the dosing channel system 23 is indicated by arrows 26.

The dosing device 1 expediently contains an electrically actuatable control valve device 27 by means of which the fluid flow 26 passing through the dosing channel system 23 can be controlled. The fluid quantities to be output can be precisely dosed with the aid of the control valve device 27. The control valve device 27 is preferably mounted on the infeed surface 25 of the channel body 14, but it can also be installed at another point on the channel body 14. The control valve device 27 is in any case preferably a component of the dosing head 6 such that it can participate in its positioning movement.

The control valve device 27 has a valve outlet 29, which is connected to the fluid infeed opening 24. It also has a valve inlet 28 via which the fluid to be dosed can be supplied. The valve inlet 28 is fluidically connected to the fluid reservoir 2 when the dosing device 1 is used as intended.

The fluid reservoir 2 is preferably indirectly, with interconnection of the channel body 14, connected to the valve inlet 28. To this end, a supply channel 32 independent of the dosing channel system 23 is formed in the channel body 14, which has an input connection 33 and an output connection 34, the valve inlet 28 communicating with the output connection 34 and the fluid line 13 leading to the fluid reservoir 2 being connectable or connected to the input connection 33. The input connection 33 and the output connection 34 are expediently located on the infeed surface 25.

During the operation of the dosing device 1, fluid located in the fluid reservoir 2 is fed according to the arrow 31 via the input connection 33 into the supply channel 32 and supplied to the valve inlet 28. The control valve device 27, which preferably has the functionality of a 2/2-way valve, can be actuated by an electronic control device not depicted further and/or manually such that it adopts either a closed position or an open position. The valve inlet 28 is separated from the valve outlet 29 in the closed position such that fluid flow 26 does not take place in the dosing channel system 23. The fluid supplied from the fluid reservoir 2 is fed through the fluid infeed opening 24 into the dosing channel system 23 in the open position of the control valve device 27 in order to be output at the fluid output openings 7 in a dosed manner The fluid quantities to be dosed can be precisely predefined via the selected duration of the open position. The fluid volume fed at the fluid infeed opening 24 is evenly distributed over the fluid quantities exiting at the fluid output openings 7.

The fluid volume distributed over the different fluid quantities emerges from the product of the channel cross-section at the fluid infeed opening 24 with the flow velocity and the duration of flow. Since the channel cross-section and the flow velocity are normally constant, the entire fluid volume to be output in a dosed manner can be precisely predefined via the selected duration of the flow, which corresponds to the opening duration of the control valve device 27.

The control valve device 27, which is for example a magnetic valve or a piezo valve, is expediently fastened by a screw connection to the channel body 14.

The dosing channel system 23 is composed of a plurality of fluid channels formed in the channel body 14, which merge into one another at various branching points 35 in a grouping still to be described.

The dosing channel system 23 has a first channel, which is designated as the input channel 36 to better distinguish it. An input 36*a* of the input channel 36 forms the fluid infeed opening 24. An output 36*b* of the input channel 36 opposed to the input 36*a* merges into two first intermediate channels 37 at a first branching point 35, 35*a*, which each define a further fluid channel of the dosing channel system 23. The two first intermediate channels 37 together form a first intermediate channel group 38.

The two first intermediate channels 37 are connected fluidically in parallel to one another. The parallel connection results from the fact that the two first intermediate channels 37 are connected with their inputs 37*a* together to the output 36*b* of the input channel 36 such that the input channel 36 branches into the two first intermediate channels 37.

Each first intermediate channel 37 has an output 37*b* opposed to its input 37*a*. Each of these two outputs 37*b* is connected to one of two second intermediate channel groups 43 via a further branching point 35, which are designated as second branching point 35*b* and third branching point 35*c* to better distinguish them. Each of these two second intermediate channel groups 43 has two second intermediate channels 42, which are connected fluidically in parallel such that they are connected to the associated branching point 35*b* or 35*c* with their two inputs 42*a* together at the output 37*b* of one of the two first intermediate channels 37.

Each second intermediate channel 42 has an output 42*b* opposed to the input 42*a*, each of these outputs 42*b* being connected to one of a plurality of output channel groups 44. In view of the fact that each second intermediate channel group 43 for example has two intermediate channels 42, the exemplary dosing channel system 23 contains in total four output channel groups 44.

Each output channel group 44 has a plurality of and by way of example two output channels 45. The output channels 45 belonging to the same output channel group 44 are connected fluidically in parallel such that they are connected with their inputs 45*a* via a further branching point 35 to the output 42*b* of one of the second intermediate channels 42. The branching points 35 arranged between the second intermediate channels 42 and the output channel groups 44 are also designated below as fourth, fifth, sixth and seventh branching points 35*d*, 35*e*, 35*f*, 35*g* to better distinguish them.

Each output channel 45 has an output 45*b* opposed to its input 45*a*, which forms one of the fluid output openings 7.

Clearly, the dosing channel system 23 preferably contains a plurality of intermediate channel groups connected in series in a cascade manner, which are incorporated between the input channel 36 and the output channel groups 44. For example, they are two intermediate channel groups 38, 43, the second intermediate channel group 43 also being designated as the last intermediate channel group 43 in relation to the sequence, the second intermediate channels 42 also being designated accordingly as last intermediate channels 42.

It is certainly possible to vary the number of intermediate channel groups to change the number of the output channel groups 44. For example, in total three intermediate channel groups could be cascaded in series such that a third intermediate channel group merges into the output channel groups 44 as the last intermediate channel group.

In the case of the illustrated exemplary embodiment, each intermediate channel group 38, 43 is composed of exactly two intermediate channels 37, 42 connected in parallel and also each output channel group 44 consists of exactly two output channels 45. Deviating therefrom, each intermediate channel group 38, 43 and also each output channel group 44 can consist of more than two intermediate channels 37, 42 or output channels 45.

Each intermediate channel group 38, 43 and also each output channel group 44 has expediently in total one U-shaped channel structure, the U opening pointing in the direction to the output surface 18. Each intermediate channel 37, 42 and each output channel 45 in particular has an angled and in particular L-shaped longitudinal course.

The output channels 45 are each composed of two channel longitudinal sections merging axially into one another. These two channel longitudinal sections are designated as input section 46 and as output section 47 to better distinguish them. The output section 47 is in particular narrowed in the manner of a nozzle and has a very small channel cross-section such that it can also be designated as a micro channel The output section 47 has the fluid output opening 7 and consequently defines the channel section of the dosing channel system 23, which discharges at the output surface 18.

The channel cross-section of the output section 47 is smaller than the channel cross-section of the input section 46 of the output channel 45 adjoining thereto upstream in the direction of the fluid infeed opening 24. Each input section 46 has one of the inputs 45*a* of the output channels 45 at the end region opposed to the output section 47.

The channel cross-sections of all output sections 47 are preferably identical to one another. The channel cross-sections of the output sections 47 are expediently the smallest channel cross-sections within the entire dosing channel system 23.

The entire dosing channel system 23, including the output channels 45 and therefore also including the output sections 47 defining the fluid output openings 7, is formed in the block-shaped channel body 14.

This means that the channel walls of the dosing channel system 23 including the channel walls delimiting the entire output channels 45 are formed by the channel body 14. The channel walls of all output channels 45 are formed by a unitary section 48 of the channel body 14 and together are combined in this unitary section 48 of the channel body 14. The output sections 47 of the output channels 45 are thus in particular not formed by individual needle-shaped elements, which have to be fastened separately to a channel body. Therefore, the dosing channel system 23 can be implemented very cost-effectively and in combination with compact dimensions of the dosing device 1.

The unitary section 48 of the channel body 14 is preferred and formed integrally corresponding to the illustrated exemplary embodiments. It preferably consists of a plastic material.

FIGS. 1 to 6 show exemplary embodiments of the dosing device 1, in the case of which the entire block-shaped channel body 14 is formed in a unitary manner and the unitary section 48 is an integral component of this block-shaped channel body 14.

Figure 7:
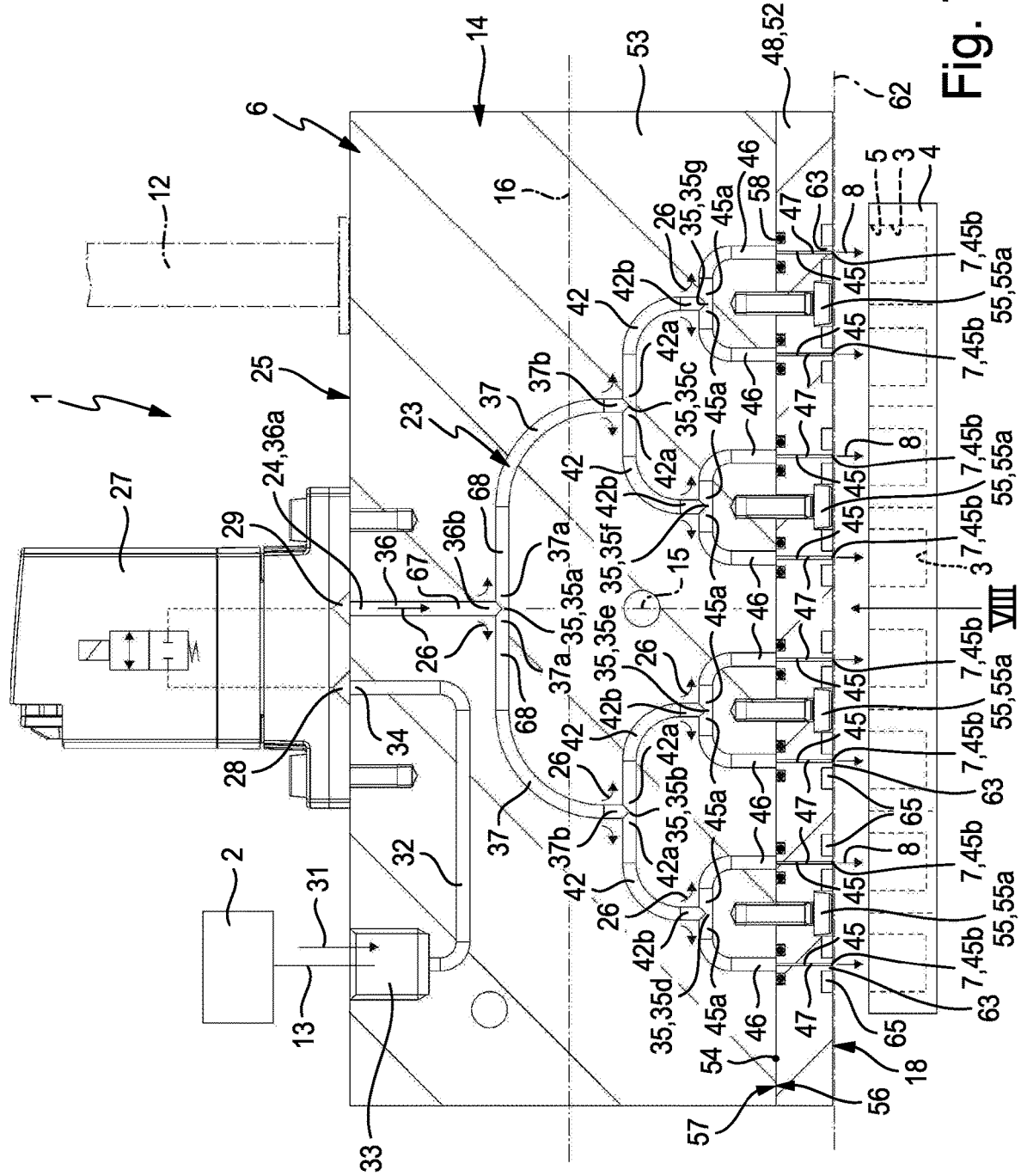
FIG. 7 shows a longitudinal sectional representation corresponding to FIG. 1 of a further embodiment of the dosing device according to the invention in a longitudinal section according to section line VII-VII from FIG. 8.

In contrast to this, in the exemplary embodiment illustrated in FIGS. 7 and 8, a modular structure of the block-shaped channel body 14 is implemented, the unitary section 48 containing the output sections 47 being formed as a unitary channel body output module 52 of the channel body 14. The channel body 14 also contains a channel body base module 53, in which all components of the dosing channel system 23 are formed with the exception of the output sections 47 of the output channels 45. In a joining region 54, which in particular runs in a plane at right angles to the vertical axis 15, the channel body output module 52 is attached to the channel body base module 53. The channel body output module 52 is fastened, in particular detachably, to the channel body base module 53 by fastening means 55. The fastening means 55 expediently define a screw connection, said fastening means containing a plurality of fastening screws 55*a* supported on the channel body output module 52 and screwed into the channel body base module 53.

The channel body base module 53 has the fluid infeed opening 24 and comprises the infeed surface 25.

The channel body base module 53 is also preferably formed as a unit. The channel body base module 53 and the channel body output module 52 are each expediently formed integrally and preferably consist of plastic material.

The joining region 54 expediently extends through the transition region between the output section 47 and the input section 46 of each output channel 45. The channel body base module 53 abuts with a first joining surface 56 on an opposing second joining surface 57 of the channel body output module 52 in the joining region 54. The input sections 46 of the output channels 45 discharge with their end sections opposed to the inputs 45a towards the first joining surface 56, where they align with apertures of the output sections 47, which are formed on the second joining surface 57. The transitions between the input sections 46 and output sections 47 in the joining region 54 are sealed to the environment by sealing rings 58.

The output surface 18, to which the fluid output openings 7 of all output channels 45 discharge, is formed on the integrally designed channel body 14 in the exemplary embodiments of FIGS. 1 to 6, while it is formed on the outer surface of the channel body output module 52 facing away from the second joining surface 57 in the exemplary embodiment of FIGS. 7 and 8.

All fluid output openings 7 expediently lie in a common plane, which is designated as the opening plane 62. The opening plane 62 expediently extends at right angles to the vertical axis 15.

In the case of the exemplary embodiment of FIGS. 1 and 2, the output surface 18 is formed as a flat surface, which is broken through only by the fluid output openings 7. The opening plane 62 coincides with the extension plane of the output surface 18.

The output surface 18 is respectively structured in a relief-like manner in the case of the other exemplary embodiments.

What is common to the exemplary embodiments of FIGS. 3 to 8 is that the output surface 18 is structured in a relief-like manner such that each fluid output opening 7 is formed at its end face on a pipe socket-like section 63 of the channel body 14. This pipe socket-like section 63 encloses a longitudinal section of the output section 47 of the output channel 45.

The outer contour of the pipe socket-like section 63 can for example be designed in a circular cylindrical manner according to FIGS. 3, 4, 7 and 8. It can, however, also be tapered in the direction of the end face 64 of the pipe socket-like section 63 according to FIGS. 5 and 6.

According to the exemplary embodiments of FIGS. 3, 4, 7 and 8, each pipe socket-like section 63 can be coaxially surrounded by an axially open, circular depression 65 of the channel body 14. This is in particular the case when the end faces 64 of the pipe socket-like sections 63 lie in the same plane as a base surface section 66 of the output surface 18, which extends around the fluid output openings 7. The opening plane 62 coincides with the base surface section 66, the pipe socket-like sections 63 being separated from the base surface section 66 by the circular depressions 65.

In the case of the exemplary embodiment of FIGS. 5 and 6, the pipe socket-like sections 63 are formed raised in relation to the base surface section 66. The pipe socket-like sections 63 protrude in relation to the base surface section 66 such that the opening plane 62 is distanced from the base surface section 66.

The dosing channel system 23, aside from the output sections 47, can have entirely the same channel cross-sections. Such a configuration is illustrated on the basis of the exemplary embodiment of FIGS. 7 and 8. The cross-sectional design implemented here with constant channel cross-sections to the output sections 47 results in the flow velocity of the fluid decreasing at each branching point 35.

It has been proven to be more advantageous when the channel cross-sections of the dosing channel system 23 are formed such that when channelling a fluid to be dosed, the flow velocity of the fluid throughout the dosing channel system 23 is constant or at least substantially constant, with the exception of in the output sections 47 in which a higher flow velocity occurs. A dosing channel system 23 structured in this way is for example illustrated in FIG. 1.

The dosing channel system 23 has numerous branching points 35, as explained. A first channel section 67 is branched into a plurality of second channel sections 68 at each of these branching points 35. This is shown in a representative manner in FIG. 1 on the basis of the first branching point 35, 35a, in the case of which the input channel 36 forms the first channel section 67 and the two first intermediate channels 37 each form a second channel section 68. A comparable branching takes place at the other branching points 35b to 35g.

The channel cross-sections are selected at each branching point 35 such that the channel cross-section of the first channel section 67 is at least substantially equal to the sum of the channel cross-sections of the adjoining second channel sections 68.

In the case of the illustrated exemplary embodiment, this means that at each branching point 35 the channel cross-section of each of the two second channel sections 69 is half the size of the channel cross-section of the first channel section 67.

The input channel 36 expediently has a constant channel cross-section over its entire length. Each intermediate channel 37, 42 and the input section 46 of each output channel 45 also expediently has a constant cross-section viewed in isolation over its entire length.

A constant flow velocity of the fluid inside the dosing channel system 23 acts in particular counter to air bubble formation and favours the output of precisely dosed fluid quantities.

What is claimed is:

1. A dosing device for dosed output of a fluid, the dosing device comprising a channel body having a dosing channel system passing through the channel body, the dosing channel system comprising:
    an input channel having a fluid infeed opening formed in the channel body to feed the fluid to be dosed;
    a first intermediate channel group fluidly connected to the input channel in a downstream direction, the first intermediate channel group having a plurality of parallel first intermediate channels, wherein each of the plurality of parallel first intermediate channels has an input and an output, the input of each of the plurality of parallel first intermediate channels being connected to the input channel at an input branching point;
    a second intermediate channel group fluidly connected to the first intermediate channel group in the downstream direction, the second intermediate channel group having a plurality of parallel second intermediate channels, wherein each of the plurality of parallel second intermediate channels has an input and an output, the input of each of the plurality of parallel second intermediate channels being connected to the output of one of the plurality of parallel first intermediate channels at a first branching point;
    a plurality of output channel groups fluidly connected to the second intermediate channel group in the downstream direction, each of the plurality of output channel groups having a plurality of parallel output channels, each of the plurality of parallel output channels having an input section and an output section, the input section of each of the plurality of parallel output channels being connected to the output of one of the plurality of parallel second intermediate channels at a second branching point, and the output section of each of the plurality of parallel output channels being directly adjoined to the input section in the downstream direction and having a cross-section smaller than a cross-section of the input section; and a plurality of fluid output openings arranged in a row beside one another to output the fluid, each of the plurality of fluid output openings being formed by a channel aperture of the output section of one of the plurality of parallel output channels of the dosing channel system, wherein the entire dosing channel system is formed in the channel body, and wherein at least one electrically actuatable control valve device is arranged on the channel body, said at least one electrically actuatable control valve device having a valve inlet and a valve outlet, and wherein the valve inlet is designed to supply the fluid to be dosed and the valve outlet is connected to the fluid infeed opening of the dosing channel system, wherein the at least one electrically actuatable control valve device is capable of selectively connecting together or separating apart the valve inlet and the valve outlet.

2. The dosing device according to claim 1, wherein at least the output sections of the plurality of parallel output channels of the dosing channel system are formed in a unitary section of the channel body.

3. The dosing device according to claim 2, wherein the entire dosing channel system is formed in a unitary section of the channel body.

4. The dosing device according to claim 1, wherein the channel body is a unitary body.

5. The dosing device according to claim 1, wherein the channel body is modularly structured and has a channel body base module and a unitary channel body output module fastened in a joining region to the channel body base module, wherein the dosing channel system including the input sections and without the output sections of the plurality of parallel output channels are formed in the channel body base module and wherein the output sections of all of the plurality of parallel output channels are formed in the channel body output module and are connected in the joining region with the input sections of the plurality of parallel output channels formed in the channel body base module.

6. The dosing device according to claim 5, wherein the channel body output module is detachably fastened to the channel body base module.

7. The dosing device according to claim 1, wherein the channel body has an outer side with an output surface, wherein the fluid output openings of the dosing channel system discharge at the output surface, wherein all fluid output openings lie in a common geometrical opening plane.

8. The dosing device according to claim 7, wherein the output surface is formed flat and the opening plane coincides with the output surface.

9. The dosing device according to claim 7, wherein the output surface comprises a plurality of pipe sections, wherein each fluid output opening is formed at an end face on a pipe section of the plurality of pipe sections of the channel body.

10. The dosing device according to claim 9, wherein each of the plurality of pipe sections of the channel body is coaxially surrounded by an axially open, circular depression of the channel body.

11. The dosing device according to claim 10, wherein the circular depressions each separate one of the plurality of pipe sections from a base surface section of the output surface, wherein each end face of each of the plurality of pipe sections lies in a same plane as the base surface section.

12. The dosing device according to claim 9, wherein the output surface has a base surface section, wherein the plurality of pipe sections of the channel body protrude in relation to the base surface such that the opening plane is distanced from the base surface section.

13. A dosing device for dosed output of a fluid, the dosing device comprising a channel body having a dosing channel system passing through the channel body, the dosing channel system comprising:

at least one fluid infeed opening formed in the channel body to feed the fluid to be dosed;

a plurality of fluid output openings arranged in a row beside one another to output the fluid; and a plurality of output channels connected between the at least one fluid infeed opening and the plurality of fluid output openings, each of the plurality of output channels having an output section and an input section, the input section being directly adjoined to the output section in an upstream direction toward the at least one fluid infeed opening, and the output section having a cross-section smaller than a cross-section of the input section, wherein each of the plurality of fluid output openings is formed by a channel aperture of the output section of one of the plurality of output channels of the dosing channel system, wherein the entire dosing channel system including the plurality of output channels is formed in the channel body, and wherein at least one electrically actuatable control valve device is arranged on the channel body, said at least one electrically actuatable control valve device having a valve inlet and a valve outlet, and wherein the valve inlet is designed to supply the fluid to be dosed and the valve outlet is connected to the at least one fluid infeed opening of the dosing channel system, wherein the at least one electrically actuatable control valve device is capable of selectively connecting together or separating apart the valve inlet and the valve outlet.

14. The dosing device according to claim 13, wherein the dosing channel system has at least one output channel group consisting of a plurality of output channels connected fluidically in parallel and wherein the dosing channel system also has an input channel comprising the at least one fluid infeed opening, and wherein the input sections of all output channels of the at least one output channel group are connected together with the input channel.

15. The dosing device according to claim 14, wherein each of the at least one output channel group consists of exactly two output channels.

16. The dosing device according to claim 13, wherein the dosing channel system has a plurality of output channel groups, each output channel group of the plurality of output channel groups having a plurality of output channels connected fluidically in parallel and wherein the dosing channel system also has an input channel comprising the at least one fluid infeed opening, wherein the input sections of all output channels of each output channel group are connected with the input channel.

17. The dosing device according to claim 16, wherein each output channel group of the plurality of output channel groups consists of exactly two output channels.

18. The dosing device according to claim 16, wherein the dosing channel system has a first intermediate channel group consisting of a plurality of first intermediate channels connected fluidically in parallel, wherein each of the first intermediate channels of the first intermediate channel group has an input connected to the input channel at a first branching point, wherein the dosing channel system has a plurality of second intermediate channel groups, each second intermediate channel group having a plurality of second intermediate channels connected fluidically in parallel, wherein each second intermediate channel of each second intermediate channel group has an output connected via a second branching point to a respective one of the plurality of output channel groups, wherein each of the second intermediate channels of each second intermediate channel group have an input connected via a second branching point with an output of one of the first intermediate channels of the first intermediate channel group.

19. The dosing device according to claim 18, wherein the second intermediate channel groups are directly connected to the first intermediate channel group.

\* \* \* \* \*